United States Patent
Gao et al.

(10) Patent No.: US 9,122,939 B2
(45) Date of Patent: Sep. 1, 2015

(54) SYSTEM AND METHOD FOR READING OPTICAL CODES ON REFLECTIVE SURFACES WHILE MINIMIZING FLICKER PERCEPTION OF PULSED ILLUMINATION

(75) Inventors: WenLiang Gao, Eugene, OR (US); Craig D. Cherry, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 584 days.

(21) Appl. No.: 13/204,627

(22) Filed: Aug. 5, 2011

(65) Prior Publication Data

US 2012/0067956 A1 Mar. 22, 2012

Related U.S. Application Data

(60) Provisional application No. 61/383,694, filed on Sep. 16, 2010.

(51) Int. Cl.
*G06K 7/10* (2006.01)

(52) U.S. Cl.
CPC .......... *G06K 7/10792* (2013.01); *G06K 7/1095* (2013.01)

(58) Field of Classification Search
USPC .................................................... 235/472.01
See application file for complete search history.

(56) References Cited

U.S. PATENT DOCUMENTS

| | | | |
|---|---|---|---|
| 4,315,245 A | 2/1982 | Nakahara et al. | |
| 4,930,884 A | 6/1990 | Tichenor | |
| 4,949,391 A | 8/1990 | Faulkerson et al. | |
| 4,969,034 A | 11/1990 | Salvati | |
| 5,010,241 A | 4/1991 | Butterworth | |
| 5,130,856 A | 7/1992 | Tichenor | |
| 5,245,168 A | 9/1993 | Shigeta | |
| 5,475,207 A | 12/1995 | Bobba | |
| 5,572,006 A | 11/1996 | Wang et al. | |
| 5,585,616 A | 12/1996 | Roxby et al. | |
| 5,705,802 A | 1/1998 | Bobba | |
| 5,723,868 A | 3/1998 | Hammond | |
| 5,756,981 A * | 5/1998 | Roustaei et al. | 235/462.42 |
| 5,837,988 A | 11/1998 | Bobba | |
| 5,936,218 A | 8/1999 | Ohkawa | |
| 6,061,091 A | 5/2000 | Van de Poel et al. | |
| 6,065,678 A | 5/2000 | Li et al. | |
| 6,189,795 B1 | 2/2001 | Ohkawa | |

(Continued)

FOREIGN PATENT DOCUMENTS

KR 10-2007-0063899 A 6/2007
KR 10-2009-0110245 10/2009

OTHER PUBLICATIONS

Hensel Jr., "Cell phone boarding passes going into use here first," http://www.chron.com/disp/story.mpl/front/5349969.html, visited Feb. 19, 2010.

(Continued)

*Primary Examiner* — Rafferty Kelly
(74) *Attorney, Agent, or Firm* — Stoel Rives LLP

(57) ABSTRACT

Methods and systems are disclosed for improved operation of readers of optical codes presented on electronic display screens or other highly reflective surfaces. Certain configurations include controlling image exposure and illumination pulse timing so as to avoid or minimize the perception of flicker of the pulsed illumination by a user or bystander while implementing methods for reading optical codes presented on electronic display screens or other highly reflective surfaces.

20 Claims, 6 Drawing Sheets

(56) References Cited

U.S. PATENT DOCUMENTS

| | | |
|---|---|---|
| 6,254,003 B1 | 7/2001 | Pettinelli et al. |
| 6,290,135 B1 | 9/2001 | Acosta |
| 6,318,635 B1 | 11/2001 | Stoner |
| 6,347,163 B2 | 2/2002 | Roustaei |
| 6,462,880 B1 | 10/2002 | Ohkawa |
| 6,505,778 B1 | 1/2003 | Reddersen et al. |
| 6,568,598 B1 | 5/2003 | Bobba |
| 6,609,660 B1 | 8/2003 | Stoner |
| 6,631,844 B1 | 10/2003 | Ohkawa |
| 6,708,883 B2 | 3/2004 | Krichever |
| 6,749,120 B2 | 6/2004 | Hung et al. |
| 6,783,068 B2 | 8/2004 | Hecht |
| 6,825,486 B1 | 11/2004 | Cole et al. |
| 6,974,084 B2 | 12/2005 | Bobba |
| 6,980,692 B2 | 12/2005 | Chamberlain |
| 6,991,169 B2 | 1/2006 | Bobba |
| 7,131,587 B2 * | 11/2006 | He et al. ............ 235/454 |
| 7,147,159 B2 | 12/2006 | Longacre, Jr. et al. |
| 7,172,125 B2 | 2/2007 | Wang et al. |
| 7,178,734 B1 | 2/2007 | Hammer |
| 7,198,195 B2 | 4/2007 | Bobba |
| 7,204,420 B2 | 4/2007 | Barkan et al. |
| 7,212,279 B1 | 5/2007 | Feng |
| 7,234,641 B2 | 6/2007 | Olmstead |
| 7,290,711 B2 | 11/2007 | Barkan |
| 7,296,744 B2 | 11/2007 | He |
| 7,398,927 B2 | 7/2008 | Olmstead et al. |
| 7,461,790 B2 | 12/2008 | McQueen et al. |
| 7,475,821 B2 | 1/2009 | Barkan et al. |
| 7,490,770 B2 | 2/2009 | Shearin |
| 7,490,776 B2 | 2/2009 | Thuries |
| 7,494,065 B2 | 2/2009 | Barkan et al. |
| 7,527,207 B2 | 5/2009 | Acosta et al. |
| 7,546,951 B2 | 6/2009 | Kotlarsky et al. |
| 7,568,623 B2 | 8/2009 | Retter et al. |
| 2002/0067850 A1 | 6/2002 | Williams et al. |
| 2002/0070278 A1 * | 6/2002 | Hung et al. ............ 235/472.01 |
| 2003/0098352 A1 | 5/2003 | Schnee et al. |
| 2003/0230630 A1 | 12/2003 | Whipple et al. |
| 2004/0179254 A1 | 9/2004 | Lewis et al. |
| 2004/0246367 A1 | 12/2004 | Yoshida |
| 2005/0253937 A1 | 11/2005 | Moholt et al. |
| 2006/0255150 A1 | 11/2006 | Longacre, Jr. |
| 2007/0001015 A1 | 1/2007 | Suzuki et al. |
| 2007/0034696 A1 | 2/2007 | Barkan et al. |
| 2007/0035718 A1 | 2/2007 | Haddad |
| 2007/0040034 A1 | 2/2007 | Hennick et al. |
| 2008/0035732 A1 | 2/2008 | Vinogradov et al. |
| 2008/0035733 A1 | 2/2008 | Vinogradov et al. |
| 2008/0080785 A1 | 4/2008 | Ford |
| 2008/0099561 A1 | 5/2008 | Douma |
| 2008/0191022 A1 | 8/2008 | Barkan et al. |
| 2009/0001166 A1 | 1/2009 | Barkan et al. |
| 2009/0001168 A1 | 1/2009 | Hammer |
| 2009/0057412 A1 | 3/2009 | Bhella et al. |
| 2009/0108076 A1 | 4/2009 | Barkan et al. |
| 2010/0219249 A1 | 9/2010 | Barkan |
| 2012/0000982 A1 | 1/2012 | Gao |
| 2012/0018516 A1 | 1/2012 | Gao |

OTHER PUBLICATIONS

Reardon, "Cell phone as boarding pass," http://news.cnet.com/8301-10784_3-9896859-7.html, visited Feb. 19, 2010.

Tsa Blog, "TSA Paperless Boarding Pass Pilot Expanding," http://www.tsa.gov/blog/2009/06/tsa-paperless-boarding$_{13}$-pass-pilot.html, visited Feb. 19, 2010.

Mobile Commerce Daily, "Hexaware launches 2D bar code boarding pass service," http://www.mobilecommercedaily.com/2009/11/30/hexaware-launches-2d-bar-code-boarding-pass-service, visited Feb. 19, 2010.

American Airlines, "Introducing Mobile Boarding Passes," http://www.aa.com/i_18n/urls/mobileBoarding.jsp, visited Feb. 19, 2010.

International Patent Application No. PCT/US2011/049556, International Search Report and Written Opinion, Feb. 9, 2012, 8 pages.

* cited by examiner

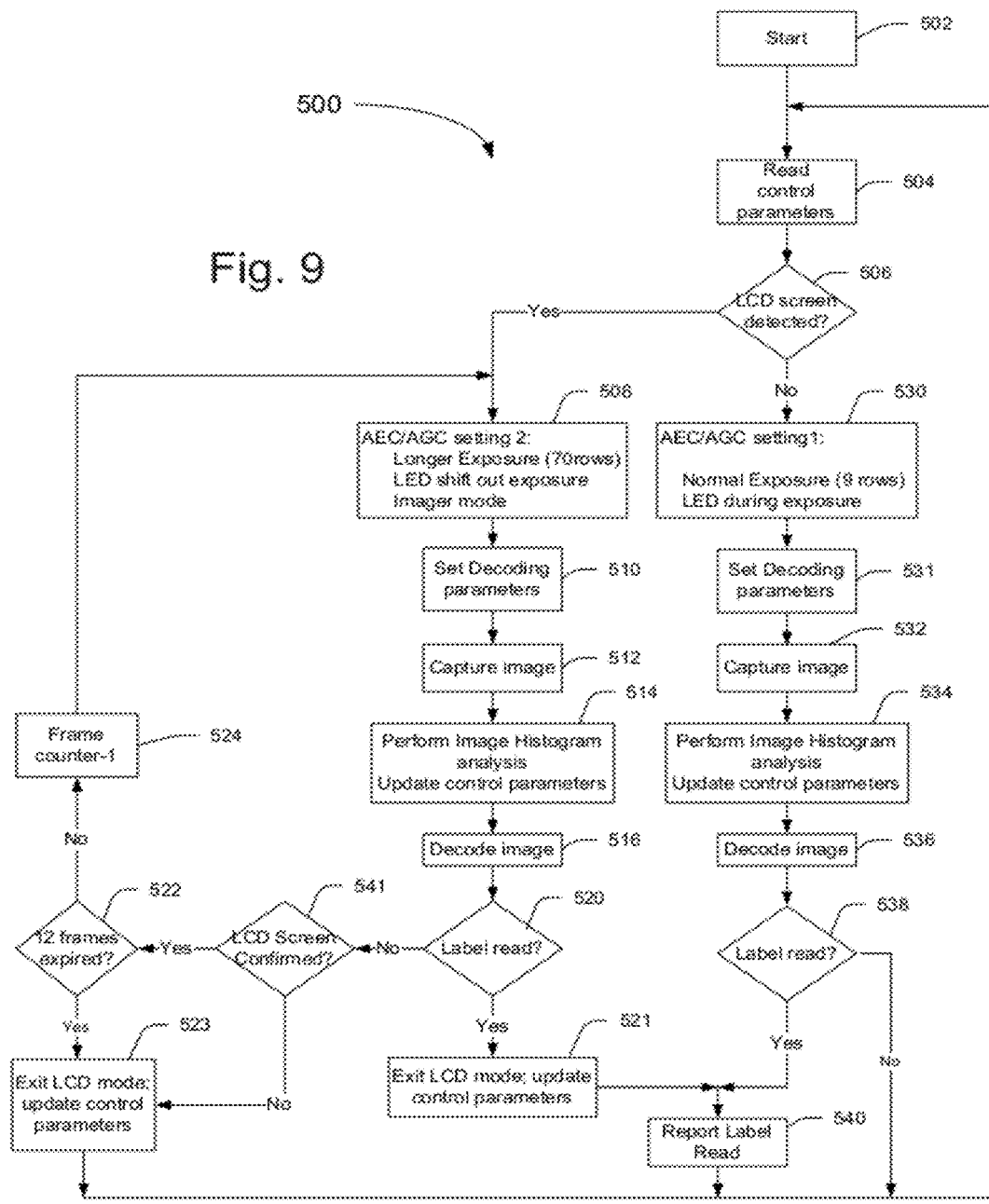

SYSTEM AND METHOD FOR READING OPTICAL CODES ON REFLECTIVE SURFACES WHILE MINIMIZING FLICKER PERCEPTION OF PULSED ILLUMINATION

RELATED APPLICATION DATA

This application claims priority to U.S. provisional application No. 61/383,694 filed Sep. 16, 2010, hereby incorporated by reference.

BACKGROUND

Optical codes, such as barcodes and other machine-readable indicia, appear in various places in a variety of applications. There are a variety of such optical codes, including: linear barcodes (e.g., UPC code), 2D codes including stacked barcodes (e.g., PDF-417 code), and matrix codes (e.g., Datamatrix code, QR code, or Maxicode).

There are several types of data readers used for reading these optical codes. The most common types of optical code readers are laser scanners and imaging readers. A laser scanner typically moves, i.e. scans, a laser light beam across the barcode. Imaging readers are typically used to capture a 2D image of an area, including the optical code or other scene, focused onto a detector array such as charge-coupled devices (CCDs) and complementary metal oxide semiconductor (CMOS) imagers. With some such imaging readers, it may be advantageous to provide a source of illumination that illuminates the optical code or other scene being imaged, to provide the required signal response in the imaging device. Such a source of illumination can reduce exposure time, thereby improving imager performance, especially in low ambient light conditions and when imaging moving items.

Businesses have begun sending optical codes to customers who display such optical codes on a portable electronic device, such as a mobile telephone, personal digital assistant, palm, tablet, or laptop computer, or other suitable device having an electronic display, such as a liquid crystal display (LCD). For example, an airline passenger may display an optical code on a portable electronic device for an airline employee to read using a data reader as verification of the passenger's ticket. In another application, a customer in a store may display an optical code on a portable electronic device for a cashier to read using a data reader to redeem a coupon. Optical codes are also included on other items having highly, or relatively highly, reflective surfaces, for example, but not limited to, identification (ID) cards, aluminum cans, and objects in plastic packaging.

Optical codes presented on, or under a highly or relatively highly reflective surface are typically difficult to decode using general-purpose data readers. In one solution to better read optical codes on LCD displays, the reader is cycled between reading modes, a first mode having the LED illumination on to illuminate the surface, and a second mode having the LED illumination off to avoid specular reflection.

Switching between the illumination and non-illumination modes results in the LED illumination to be cycled on and off producing an annoying/distracting light flickering as perceived by the user or bystander. For most people, light pulsed at a frequency in excess of 50 Hz will exceed their so-called "flicker fusion frequency" and no flicker effect will be perceived. The flicker fusion frequency of human vision typically ranges from as low as about 15 Hz to as high as about 65 Hz. To avoid flicker fusion, U.S. Pat. No. 7,234,641 discloses pulsing the light at a sufficiently high frequency (e.g., in excess of 50 Hz) to avoid the flicker effect.

The present inventors have, therefore, recognized a need for improved methods of pulsing illumination for a data reader. The present inventor has also recognized a need for methods of pulsing illumination in conjunction with operating an imaging reader, particularly methods for electronic display screens reading that avoid the flicker effect.

SUMMARY

Methods and systems are disclosed for improved operation of readers of optical codes presented on electronic display screens or other highly reflective surfaces.

In certain embodiments, systems and methods of pulsing one or more sources of illumination are disclosed for avoiding or minimizing the perception of illumination flicker by a user or bystander while implementing methods for reading optical codes presented on electronic display screens or other highly reflective surfaces.

Additional aspects and advantages will be apparent from the following detailed description of preferred embodiments, which proceeds with reference to the accompanying drawings.

BRIEF DESCRIPTION OF THE DRAWINGS

FIG. 9 is a flow chart of a program algorithm for data reading of an optical code being displayed on an electronic display according to another embodiment.

DETAILED DESCRIPTION OF PREFERRED EMBODIMENTS

The described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments. For convenience, the methods and systems may be described herein with reference to barcodes or other optical codes, however, it is understood that the methods described herein are applicable to any host computer and to any type of optically readable code, such as, but not limited to, those described above, fingerprints, and other suitable codes.

Figure 1:
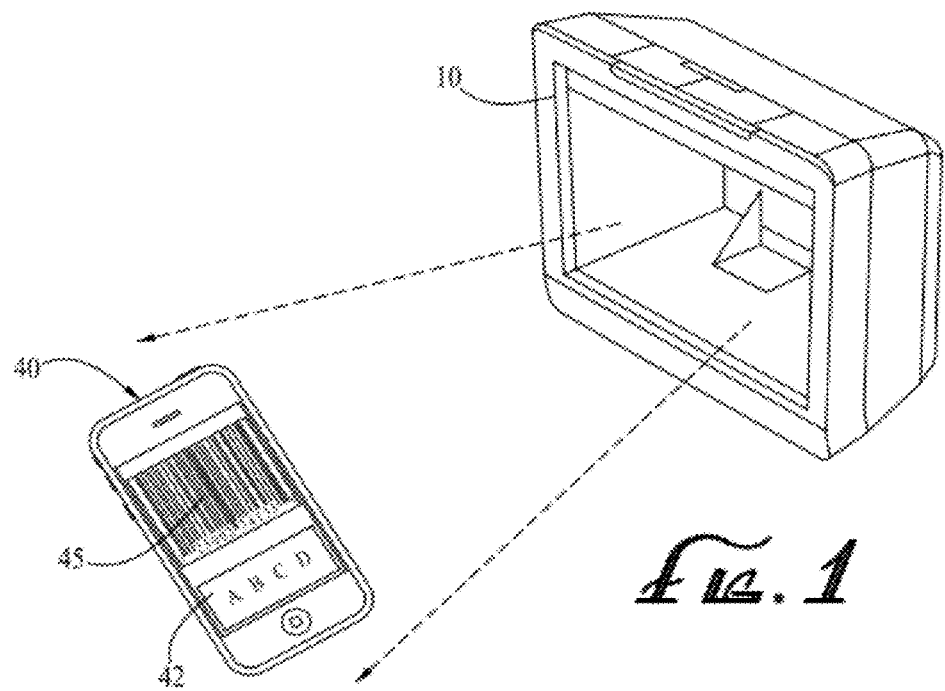
FIG. 1 schematically illustrates a data reader reading an optical code displayed on an electronic display screen of an electronic device.

FIG. 1 is a diagrammatic view of a data reader 10 in accordance with a first embodiment shown reading a barcode 45 displayed on the display screen 42 of a pda (personal digital assistant) or cell phone 40 (a smartphone being illustrated). The data reader 10 is illustrated as a Magellan® 3200VSi model bar code reader available from Datalogic of Eugene Oreg. (U.S.A.), but any suitable imaging reader may be employed. The data reader 10 is schematically depicted as a presentation scanner suitable for reading optical codes, symbols, or other items. The data reader 10 is illustrated, by way of example, as a single window reader with a vertically-oriented window 14. The reader 10 may configured as a fixed unit (mountable to a support surface or free standing on a horizontal surface) or a handheld unit. The reader 10 may alternately be configured as a combined handheld/fixed unit, e.g., one that may rest/be self-supporting upon a horizontal surface but be grasped by the user and moved to aim toward an item to be read.

Figure 2:
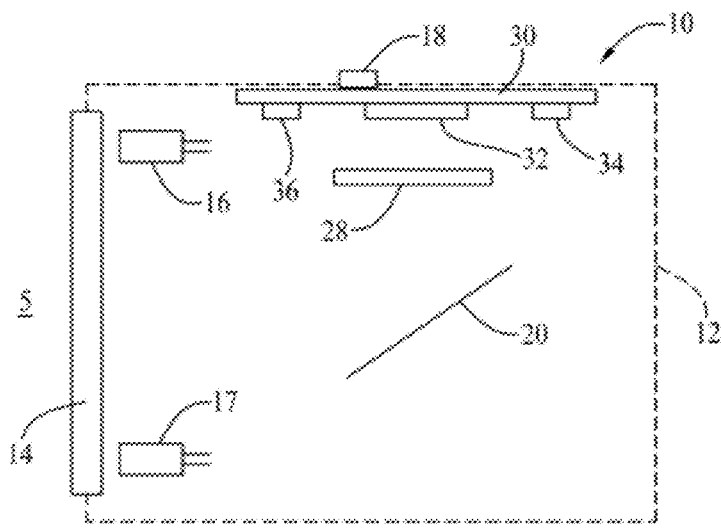
FIG. 2 is a diagrammatic view of a data reader according to a preferred embodiment.

FIG. 2 is a diagram illustrating elements of the data reader 10 according to a first embodiment. The data reader 10 has a housing 12 with a front window 14 and one or more illumination sources 16, 17 (the reader 10 showing an upper LED array 16 and a lower LED array 17) for illuminating the read region 5 in front of the window 14. An image of the field of view 5 is reflected by a mirror 20 upwardly (or downwardly depending on the reader configuration) where it is focused by focusing optics 28 onto an imaging array 32. The imaging array thus acquires a two-dimensional (2D) image of the field of view 5, converting the 2D image into an electronic signal (i.e., pixel data). The imaging array 32 is shown mounted on a printed circuit board 30 disposed on the bottom of the reader housing 12. Preferably, the data reader 10 may include on-board memory 36 and a controller or imager processor 34 (also mounted on PCB 30) for controlling operation of the imager 32 and other reader components.

Figure 3:
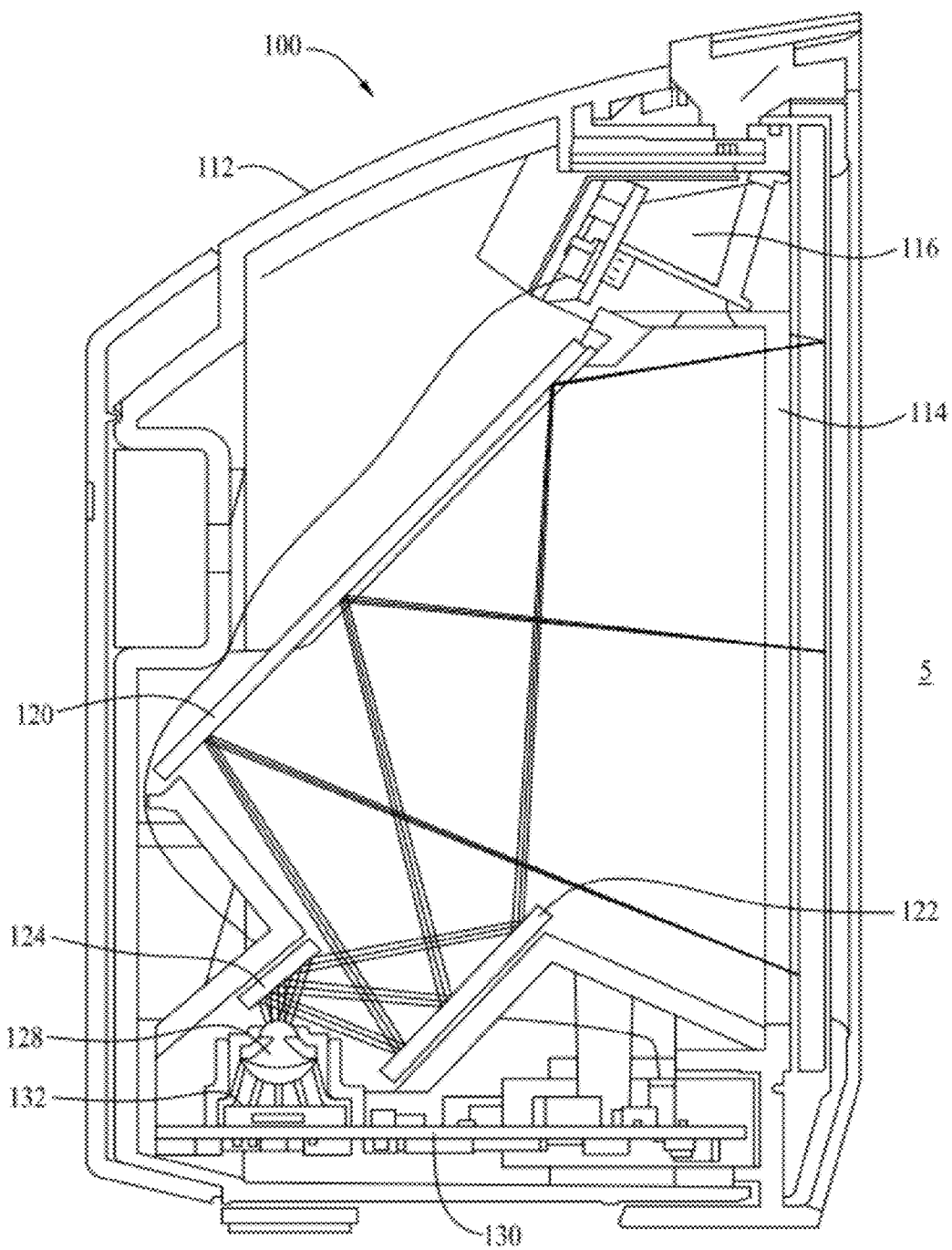
FIG. 3 is a diagrammatic view of a data reader according to another preferred embodiment.

FIG. 3 is a diagram illustrating elements of another data reader 100 similar to the reader 10 of FIG. 2. The data reader 100 has a housing 112 with a front window 114 and one or more illumination sources 116 for illuminating the read region 5 in front of the window 114. An image of the field of view 5 is reflected by a first mirror 120 downwardly to a second mirror 122, sidewardly to a third mirror 124 and then downwardly where it is focused by focusing optics 128 onto an imaging array 132 that acquires a 2D image of the field of view 5. The imaging array 132 is shown mounted on a printed circuit board 130 disposed on the bottom of the reader housing 112. Preferably, the data reader 100 includes a controller or imager processor 134 (also mounted on PCB 130) for controlling operation of the imager 132 and other reader components.

Other reader configurations may be employed such as those disclosed in U.S. application Ser. No. 13/188,244, hereby incorporated by reference, as well as any other suitable configuration.

In any of a mounted, hands-free, or hand-held mode, data reading may be activated by a suitable process such as for example (1) actuation of the trigger or switch 18, (2) automatically by the processor 34 detecting the presence of an item within a scan volume in front of window 14, or (3) by always being in a capture and decode images mode as long as the data reader 10 is in a scanning mode. An optical code such as code 45 on the electronic display screen 42 (or other surface) or other item may be read by presenting the item bearing the optical code into the read region in front of the window 14.

The following description will be made with reference to data reader 10 but shall be understood as being similarly applicable to reader 100. The data reader 10 preferably comprises an imager 32 such as a complementary metal oxide semiconductor (CMOS) imager. Alternately, a charged couple device (CCD) or other suitable imager may be used.

The imager 32, alone or together with logic components such as a complex programmable logic device (CPLD) or a field-programmable gate array (FPGA), is coupled to the processor 34, which, among other functions, is preferably programmed to control operating parameters of the data reader 10 as discussed in detail below. Processor 34 is also preferably programmed to read and decode optical codes or other symbols or imaged items. The imager 32 may comprise a model eV76C560 imager by available from e2v Ltd. of Chelmsford, United Kingdom. Alternately, the imager may comprise an active-pixel imaging CMOS sensor with a global shutter, such as a model MT9V022 sensor sold by Micron Technology, Inc. of Boise, Id., USA, or may operate on a rolling basis.

The processor 34 may comprise any suitable digital processor, such as a low-power DSP core or ARM core processor. In preferred embodiments, processor 34 comprises an ARM9 processor AT91 SAM9G20 sold by Atmel of San Jose, Calif., USA, or OMAP processor sold by Texas Instruments of Dallas, Tex., USA or an i.MX1 series processor (such as the MC9328MX1 processor) sold by Freescale Semiconductor, Inc. of Austin, Tex., USA. Alternately, multiple processors or sub-processors or other types of processor electronics such as comparators or other specific function circuits may be used alone or in combination. For the purposes of this description, the term processor is meant to include any of these combinations.

The illumination source 16/17 preferably comprises a collection of LEDs, for example, infrared or visible spectrum LEDs, but may alternatively comprise another suitable light source, such as a lamp or laser diode. Each LED array may comprise one or more LEDs. As an example, the upper LED array 16 may comprise four LEDs arranged in a line at the top of the reader and the lower LED array 17 may similarly comprise four LEDs arranged in a line at the bottom of the reader. The illumination sources 16/17 may be coupled to and controlled by the processor 34, or may be remotely mounted and powered. A power supply circuit is preferably provided for energizing the LEDs. The reader 100 for example may have two LED arrays, one of the arrays 116 being at the top left side of the housing 112 and the other at the top right side.

System electronics may also include a memory 36 (e.g., mounted on PCB 30), such as a flash memory, random access memory, or other suitable memory, communicates with processor 34. Alternately, memory 36 may be integrated with the processor 34.

The controller or processor 34 is programmed to analyze an image scene to determine whether it is advantageous to change one or more operating parameters of the data reader 10. Such image analysis could occur for every frame captured by an imager 32, or alternately, may not occur for every frame, for example, image analysis may occur on a periodic basis.

In one mode of operating to capture and decode an optical code, the data reader 10 is activated, preferably by processor 34 detecting an item, such as electronic display 42 on the device 40, within a read volume 5 or by activation of trigger 18, to capture a first set of images of the item bearing an optical code, such as optical code 45. The first set of images may include only one image, but preferably includes two or more images. Alternately, data reader 10 may continuously be on, i.e., operate or scan continuously.

In order to improve reading of the reflective surfaces of a display screen 42 depicting the barcode 45, it is desirable for the reader to enter a specialized reading mode with the illumination turned off. There are various methods for the data reader 10 to detect that a display screen is in the read region such as disclosed in U.S. application Ser. No. 13/106,659 hereby incorporated by reference. One such method will be described, but any suitable method may be employed.

An imaging array 32 such as the model eV76C560 imager by e2v requires an image of a field of view and outputs a signal indicating a light intensity value as absorbed at the pixel. For an 8-bit value imager, the intensity value range is from 0 to 255, 0 being a no light or dark body condition (minimum intensity) and 255 being a saturated condition (maximum intensity). In between there is a relatively gray scale value for the pixel. For a 10-bit value imager, the pixel value ranges from 0 to 1024. The imager also outputs a histogram of how many pixels are of a particular pixel value range. The histogram can be calculated by using all or partial pixels of image for imagers that do not output histogram data.

When attempting to read a barcode displayed by an LCD or other display screen, there tends to be a large number of pixels having saturated or high intensity pixel values ($V_{HIGH}$ or higher) due to the reflective nature of the display screen, while at the same time there is a large number of pixels with very low intensity pixel values ($V_{LOW}$ or lower) for the same reasons. By taking a histogram of the output, it can be determined that if an image capture shows a certain large number of shiny (saturated or near saturated) pixels (i.e., pixels of high intensity value $V_{HIGH}$ or higher) and a relatively large number of dark pixels (i.e., pixels of low intensity value $V_{LOW}$ or lower) then it is concluded that the image is an LCD screen and the processor is switched to the LCD screen reading mode. To provide a few more examples, the preferred system may have these threshold values, $V_{HIGH}$ and $V_{LOW}$, set by any number of methods, including (1) the values may be preset; (2) the values may be programmable values, selected by the user or by the technician selecting the values preferred for the particular establishment lighting conditions or the types of LCD screens being read; or (3) the values may selectable according to a self-learning program/algorithm such as the system remembering the values that it used when switching to cell phone mode and then using those values. The following is an example by which LCD screen indication can be made.

Example A—Condition 1: a certain number of pixels, for example 100 pixels (0.7%) having greater than a given/selected high intensity value (example intensity value $V_{HIGH}$=200 or higher); and Condition 2: a large percentage (example 70%) of pixels are below a low intensity value (example intensity value $V_{LOW}$=50 or lower). These values are for an 8-bit value imager having a range of 0-255.

If both conditions 1 and 2 above are satisfied (i.e., both the shiny pixel percentage and the dark pixel percentage are above the specific threshold percentage ranges), then it is assumed that an LCD screen has been read.

Another way of describing this method of LCD screen presence is by analyzing image histogram to determine whether the histogram is bi-modal, i.e., exhibits two peaks, or more than two peaks. One exemplary manner for analyzing the histogram includes using, or establishing, a low threshold and a high threshold. Preferably the low threshold corresponds to a number representing a range of dark, or relatively dark, pixels (low to relatively low grayscale) and the high threshold corresponds to a number representing a range of saturated, or relatively saturated, pixels (high to relatively high grayscale).

For example, an imager that captures eight bit image data preferably includes a grayscale ranging from 0 to 255, where 0 corresponds to dark pixels, (i.e., pixels receiving no, or almost no light), and 255 corresponds to saturated pixels, (i.e., pixels receiving so much light that a pixel registers a white portion of an image, even when the corresponding part of the item imaged by such a pixel is not white). In one embodiment for an eight bit imager, a low threshold may include only pixels registering 0 on the grayscale and a high threshold may include only pixels registering 255 on the grayscale. Alternately, a low threshold may include pixels in a dark-end range on the grayscale, such as 0 to 10, 0 to 20, 0 to 30, 0 to 40, 0 to 50, 0 to 60, or other suitable range, and a high threshold may include pixels in a light-end range on the grayscale, such as 200 to 255, 210 to 255, 220 to 255, 230 to 255, 240 to 255, or other suitable range.

The processor preferably determines whether a first predetermined percentage of pixels fall within the low threshold and whether a second predetermined percentage of pixels fall within the high threshold. For example, processor preferably obtains or calculates a first number of pixels where each pixel has a grayscale value in the low threshold, such as 0 to 75, for example. The processor preferably also obtains or calculates a second number of pixels where each pixel has a grayscale value in the high threshold, such as 235 to 255, for example. The processor next determines whether the first number of pixels is greater than the first predetermined percentage of pixels and whether the second number of pixels is greater than the second predetermined percentage of pixels. In one embodiment, for an imager having 360,960 pixels (a 752×480 pixel grid), a low threshold of 0 to 75 the first predetermined percentage of pixels is 40% of the imager's total number of pixels and for a high threshold of 230 to 255 the second predetermined percentage of pixels is 8% of the imager's total number of pixels. Other suitable percentages may be used for the same low and high thresholds. Alternately, other suitable percentages, or the same percentages, may be used for other suitable low and high thresholds and for imagers having the same or a different total number of pixels.

Figure 4:
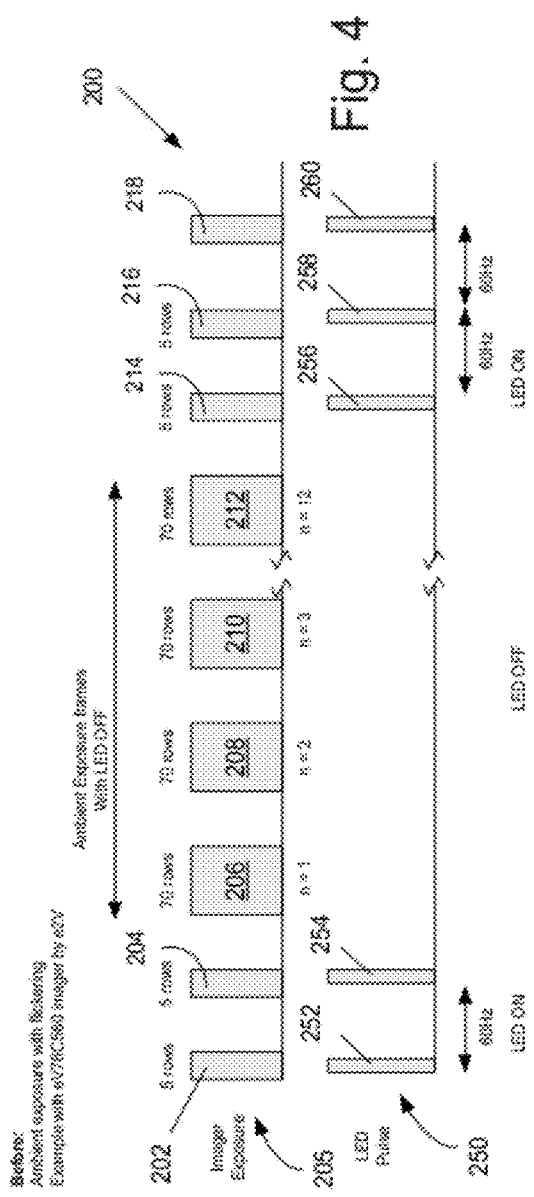
FIG. 4 is a timing diagram illustrating relative timing of imager frame exposure and illumination pulses with a fixed pulse rate illumination.

FIG. 4 illustrates a timing diagram 200 of an imager frame exposure and illumination pulse sequence with a fixed pulse illumination rate. The top row 205 indicates imager exposure times and the lower row 250 indicates the LED illumination pulse times. The imager exposure time may range from approximately 1 to 10 rows which corresponds to about 26 μs—260 μs. The imager is provided with exposure control depending upon the overall exposure of a particular image, the exposure time of the subsequent image will be adjusted up or down accordingly.

Looking to the rows of imager exposure, the first exposure 202 has an exposure time of 5 rows (about 95 μs). A histogram of the image is analyzed according to the above-described methodology to determine whether an LCD screen is in the field of view. In this instance, the image did not constitute an LCD screen and thus for the second exposure 204, the reader remains in normal operating mode. The imager may also adapt its exposure time for the second exposure 204 depending upon the results of the first exposure. The second row 250 shows a corresponding illumination pulse for illuminating the field of view. The pulses 252, 254, 256, etc., are fixed length pulses pulsed at a given frequency (60 Hz); pulsed to coincide within the respective image exposures 202, 204. At the second image exposure 204, a histogram indicates by the above process that an LCD screen has been detected in the read region and thus for the next exposure (exposure 206) the reader switches to LCD reading mode for a cycle of 12 images (four of which are being shown 206, 208, 210, and 212) with the longer exposure time of 70 rows (corresponding to about 1200 μs). In the LCD reading mode, this longer exposure time is provided to give the reader additional exposure since the illumination LED is off during the LCD reading mode, whereby the LCD is read/illuminated only by ambient light or LCD backlight. At the end of the 12 images taken during the LCD reading mode (or optionally earlier if a label is read before the 12$^{th}$ image), the reader switches back to normal reading mode at image exposure 214 illuminated by LED pulse 256 and the normal reading process takes over again. Exposure 214 is again a short exposure (1-10 rows) illuminated by LED pulse 256. The histogram of image 214 shows the image taken is not an LCD screen thus the example proceeds to exposure 216 and remains in standard mode illuminated by LED pulse 258 and again the image exposure 216 indicates an LCD screen is not shown and reader remains in standard mode for the next image exposure 218 illuminated by LED pulse 260.

Figure 5:
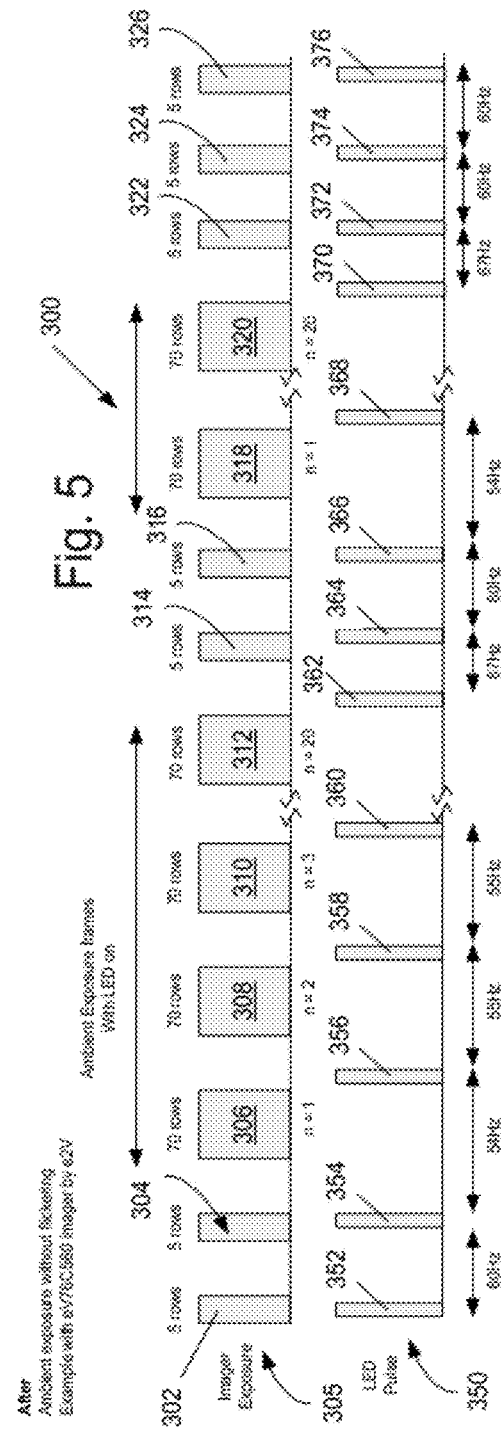
FIG. 5 is a timing diagram illustrating relative timing of imager frame exposure and illumination pulses, in accordance with a preferred embodiment.

The diagrams 200, 300 of FIGS. 4-5 show exposure times as 5 rows, a middle value for the exposure, but as described herein the exposure time is set in a range of 1-10 rows, 26 μs to 260 μs, depending upon the adaptive exposure setting according to the prior exposure analysis.

As is seen by illumination row 250 in the chart 200, there is a large gap between illumination pulse 254 and illumination pulse 256. Depending upon the number of cycles between the standard reading mode with the LED on and the LCD reading mode with the LED off, a perceptible flicker can be visible to the user or others and cause either annoyance or discomfort.

To avoid this annoying flicker, an alternate system with the LED illumination being illuminated during each image exposure cycle is defined. FIG. 5 is a timing diagram 300 illustrating an imager exposure row 305 and LED illumination pulse row 350 corresponding thereto. Conceptually, during standard mode, the LED pulse illuminates during image exposure while during the LCD mode, the illumination pulse is set to follow or be otherwise offset from the exposure (the LED pulse being exposures). In such a process, the time between LED pulses tends to be much smaller, on the order of 55 Hz, which is generally above the frequency of a human eye and therefore is not perceived as the annoying flicker when the reader is switched between standard reading mode and the LCD reading mode.

Turning in more detail to the figure, exposure 302 runs a histogram indicating that an LCD screen is not indicated/detected and then the reader proceeds to remain in the standard mode for the next exposure 304. LED pulses 352 and 354 must align with each of the respective exposures 302, 304. Exposure 304 is analyzed and indicates that the exposure as shown is an LCD screen and for the next image exposure 306 switches to LCD reading mode with a much longer 70 row exposure 306. The amount of exposures in the LCD mode is preferably a set programmable amount. In this example, a number of 20 exposures is selected. The number of exposures may be preset and fixed for the reader at the point of manufacture, programmable by the user, variable as controlled by a program criteria such as dependent on the LCD mode cycles attempted, or dependent on whether a LCD screen is confirmed by image histogram analysis. Alternately the amount of exposures in the LCD mode may be controlled via a timer, for example the timer permitting exposures for a set time (e.g., 0.5 seconds, the timer being operative for measuring or counting down the given time for LCD mode capture/read attempts), that time being set at point of manufacture, programmable by user, variable as controlled by a program criteria.

The LCD mode exposure time is shown as a fixed time (70 rows=about 1280 μs), but may be longer or shorter (for example 50 rows to 100 rows) with Automatic Exposure Control on. The LCD mode exposure time may be preset and fixed for the reader at the time of manufacture, programmable by the user, or variable as controlled by a program criteria such as adapted based upon feedback from the previous exposure. The LCD mode exposure time (on the order of 50-100 rows) is much longer that the standard mode exposure time (1-10 rows) and thus is on the order of 10 times or more (5× to 100×) longer.

The LED pulse 356 is intentionally offset and outside of the imager exposure 306. Similarly, the LED pulses 358, 360, and 362 are outside of their respective exposures 308, 310, 312. Thus during the LCD reading mode, the exposures are illuminated only by ambient light and LCD display backlight if LCD display is in scan volume because the LED illumination pulses are offset or otherwise between consecutive image exposures. If an optical code is successfully read (one or more times as required) during the LCD reading mode, the reader exits the LCD reading mode (acknowledging with a good read signal and reporting/transmitting the code) and returns to standard reading mode looking for a subsequent barcode. The processor/decoder includes suitable two-label reading prevention schemes.

If no barcode is successfully read after given number of cycles (e.g., the 20 cycles) in the LCD reading mode, the system returns to standard reading mode, and proceeds to image exposure 314 which is illuminated by LED pulse 364. Image exposure 314 has its histogram analyzed and in this example it is determined that an LCD screen is not present and for the subsequent image exposure 316 the reader remains in the standard mode illuminated by LED pulse 366 (the pulse occurring during or overlapping the exposure 316. At image exposure 316, it is again determined that an LCD screen is detected and thus for the subsequent 20 exposures 318-320, the reader switches to LCD reading mode with LED pulses 368-370 offset from the respective image exposures as previously described. After the 20 cycles (or optionally immediately if a barcode is successfully read) the reader returns to standard reading mode at image exposures 322, 324, 326 illuminated by respective LED pulses 372, 374, 376 as previously described.

Figure 6:
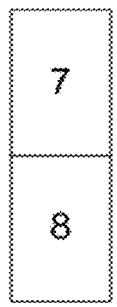
FIG. 6 (comprising FIGS. 7 and 8) is a flow chart of a method for data reading of an optical code being displayed on an electronic display according to a preferred embodiment.
Figure 7:
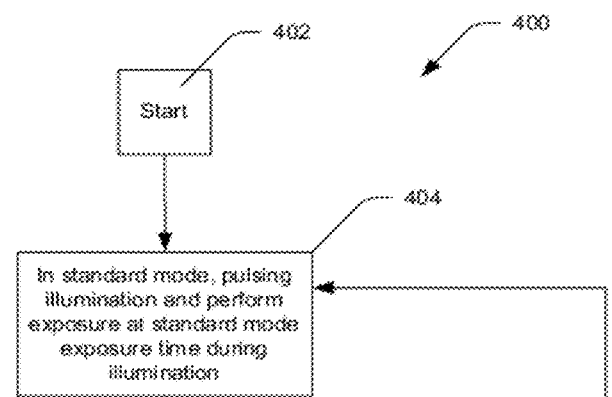
Figure 7:
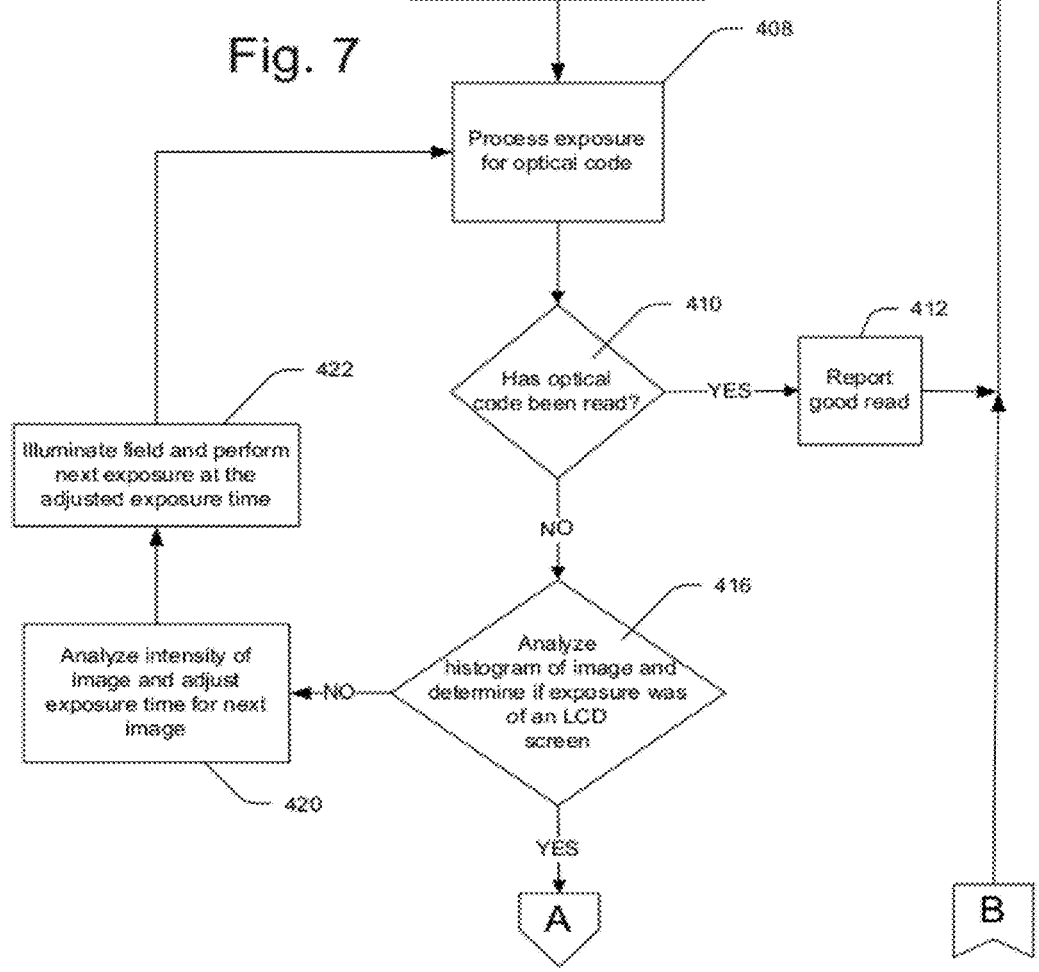
Figure 8:
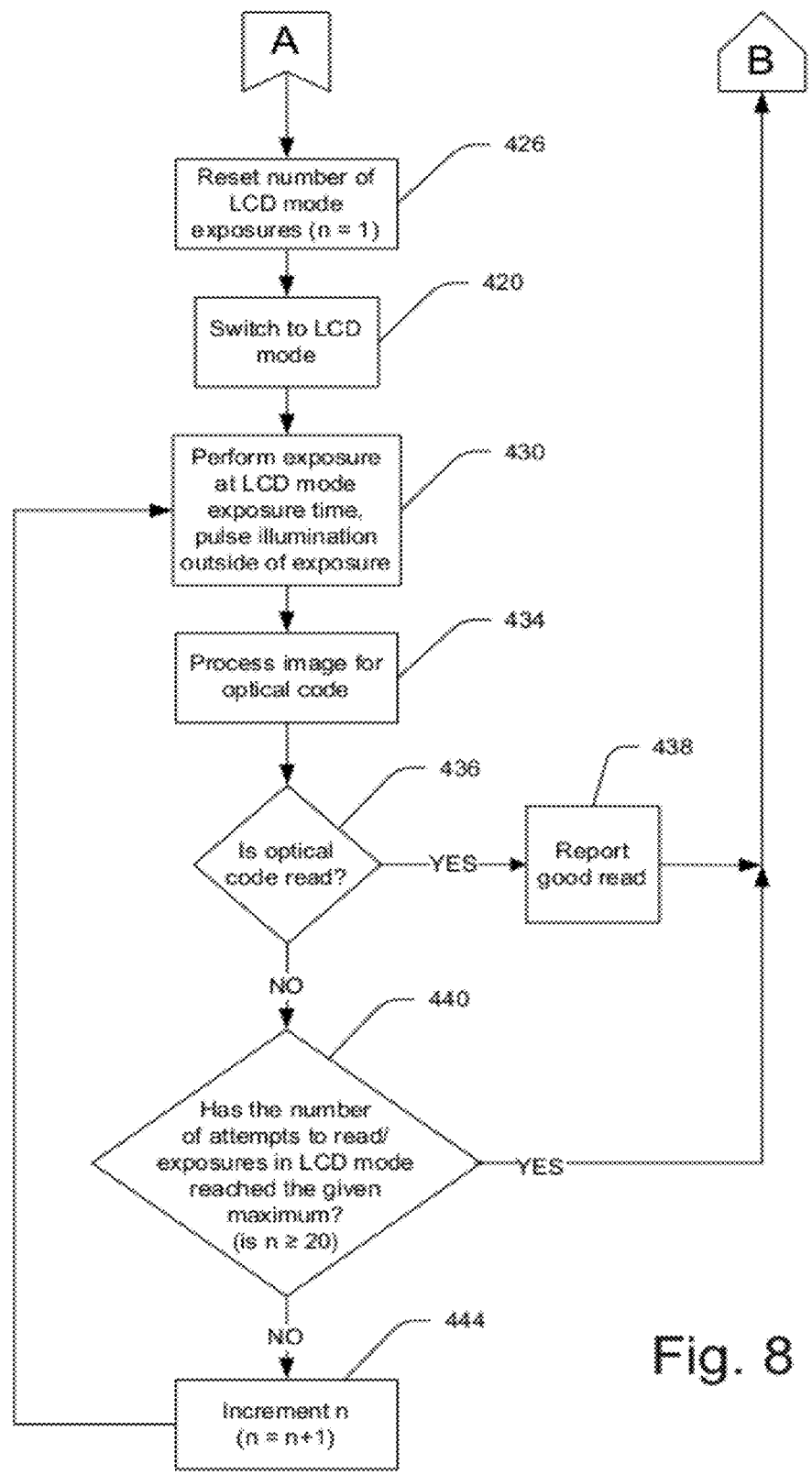

FIG. 6 (comprised of FIGS. 7 and 8) is a flow chart of a method 400 according to one embodiment, the method comprising the following steps, the steps typically being performed via a processor contained in electronic circuitry of the data reader:

At Step 402—Start.

At Step 404—In standard mode, pulsing illumination and performing exposure (capturing an image or set of images) at standard mode exposure time during illumination. Illumination may comprise an LED pulse, the exposure is timed such that the LED pulse is within or overlaps with the exposure. Exposure time for the first exposure may be preset (e.g., 5 rows), programmable, or may be set to the last exposure previously taken.

At Step 408—Processing exposure image(s) for detecting and reading optical code.

At Step 410—Determining if an optical code has been read successfully. If Yes a code has been read successfully, proceeding to Step 412 to report a good read, and if No proceeding to Step 416.

At Step 412—From the Yes condition in Step 410, reporting a good read of the optical code and then proceeding to Step 404.

At Step 416—From the No condition in Step 410, analyzing a histogram of the exposure and determining if the exposure was of an LCD screen; if No proceeding to Step 420, and if Yes proceeding to Step 426.

At Step 420—Analyzing intensity of the image and adjusting exposure time for the next image exposure.

At Step 422—Illuminating field and performing next exposure at the adjusted exposure time (from Step 420); then returning to Step 408.

At Step 426—From the Yes condition in Step 416, resetting number of LCD mode exposure attempts (n=1).

At Step 430—Performing exposure at LCD mode exposure time, and pulsing illumination outside of the exposure. The LCD mode exposure time is larger (e.g., 70 rows) since exposure is via ambient illumination. The LED illumination is still pulsed, but occurs after exposure so that the illumination does not interfere with the ambient illumination reading during the LCD mode exposure.

At Step 434—Processing exposure image for detecting and reading an optical code.

At Step 436—Determining whether an optical code has been read successfully. If Yes proceeding to Step 438 for reporting a good read; if No proceeding to Step 440.

At Step 438—From the Yes condition in Step 436, reporting a good read and then returning to Step 404.

At Step 440—From the No condition in Step 436, determining whether the number of attempts to read/exposures in the LCD mode has reached the given maximum (is n≥20). If Yes, return to Step 404 (to switch back to standard mode) and if No, proceed to Step 444.

At Step 444—Incrementing n (n=n+1); proceed to Step 430 to perform a subsequent exposure in the LCD mode.

The method 400 may include additional steps and features, and certain steps may be omitted, and certain steps may be combined. For example as to omitting a step, Step 420 may be omitted and the exposure time may be constant or be varied by a set pattern rather than being adaptive. For example as to adding steps, an optical code portion acquired in one image may be combined with another optical code portion from another image and thus be assembled into a complete optical code, the process being generally known as stitching. For example as to combined steps, Step 416 may be omitted and combined with Step 404 whereby Step 420 proceeds directly to Step 404 (instead of Step 408) and the exposure time (in Step 404) would be set in accordance with Step 420. Though a given sequence of steps in method 400 is described, certain of the steps may be undertaken in other/different sequences. For example, the incrementation in Step 444 and the resetting of Step 426 may be undertaken at any suitable time; in another example, the intensity analysis of Step 420 may be undertaken before Step 410 or in conjunction with Step 408.

FIG. 9 is a flow chart of a program algorithm 500 for data reading of an optical code being displayed on an electronic display according to another embodiment, comprising the following steps:

At Step 502—Start.

At Step 504—Read control parameters. These control parameters for an initial read may be preset in the software/firmware or programmable, but once the system is operating, the parameters correspond to the parameters set by the prior image captured.

At Step 506—Determining if an LCD screen has been detected in the prior image exposure as set forth in the updated control parameters (as will be explained below with respect to Steps 514 and 534). If NO proceed to Step 530 (standard mode with illumination) and if YES proceed to Step 508 (LCD mode without LED illumination). In a preferred implementation, the system actually processes several images and analyzes a plurality of images rather than a single image when making decisions. In one configuration, the system requires multiple frames/exposure (e.g., five consecutive frames) satisfying the LCD screen detection condition before switching to LCD mode.

At Step 530—With no LCD detected from Step 506, setting Automatic Exposure Control/Automatic Gain Control (AEC/AGC) to setting 1 with normal exposure at 1 to 9 rows and illuminated by the LED pulse during exposure.

At Step 531—Setting decoding parameters. These parameters may include how long to spend on 2D label decoding, how long to spend on 1D decoding, selection of symbology decoding order (which one is first, which one is last, etc.), and other typical decoding parameters. The decode parameters set at Step 531 may be programmable and are preferably suited for the standard mode (illuminated) reading.

At Step 532—Capture image of the field of view.

At Step 534—Performing image histogram analysis (to determine whether an LCD screen has been detected) and updating control parameters for the next exposure (e.g., analyzing intensity of the image and adjusting exposure time for the next image exposure).

At Step 536—Decoding the image.

At Step 538—Determining if an optical code has been read successfully. If YES a code has been read successfully, proceeding to Step 540 to report a good read, and if NO proceeding back to Step 504.

At Step 550—From the YES condition either Step 538 or Step 520, reporting a good read of the optical code and then proceeding to Step 504.

Turning to Step 508—From the YES condition in Step 506, wherein an LCD was detected from Step 506, setting Automatic Exposure Control/Automatic Gain Control (AEC/AGC) to setting 2 (LCD screen mode) with longer exposure at 70 rows (for example) and not illuminated by the LED pulse during exposure, the LED illumination pulse being shifted outside of the exposure. The LCD mode exposure time is longer (e.g., 70 rows) since exposure is via ambient illumination (including the backlighting from the LCD). The LED illumination is still pulsed, but occurs outside exposure so that the illumination does not interfere with the ambient illumination reading during the LCD mode exposure.

At Step 510—Setting decoding parameters. These parameters may include how long to spend on 2D label decoding, how long to spend on 1D decoding, selection of symbology decoding order (which one is first, which one is last, etc.), and other typical decoding parameters. The decode parameters set at Step 510 may be programmable and are preferably suited for the LCD mode (non-illuminated) reading.

At Step 512—Capture image of the field of view.

At Step 514—Performing image histogram analysis (to determine whether an LCD screen has been detected) and updating control parameters for the next exposure (e.g., analyzing intensity of the image and adjusting exposure time for the next image exposure).

At Step 516—Decoding the image.

At Step 520—Determining if an optical code has been read successfully. If YES a code has been read successfully, proceeding to Step 540 to report a good read, and if NO proceeding to Step 541.

At Step 541, determining if presence of an LCD screen is confirmed. If Yes proceed to Step 522, if No proceed to Step 523 for exiting LCD mode, updating control parameters and returning to Step 504.

At Step 522—From the Yes condition in Step 541, determining if the counter of given number of frames (image exposures) has been attempted (e.g. 12 frames), namely that the counter has expired. If YES, proceed to Step 523 for exiting LCD mode, updating control parameters, and returning to Step 504 and if NO proceeding to Step 524.

At Step 524—From the NO condition in Step 522, counting down/decrementing the counter (n=n−1) for the number of LCD mode exposure attempts remaining, then returning to Step 508 for another exposure in LCD screen mode.

The method 500 may include additional steps and features, and certain steps may be omitted, and certain steps may be combined. For example as to omitting a step, portions of Step 530 may be omitted and the exposure time may be constant or be varied by a set pattern rather than being adaptive. In another example, Step 514 may be omitted with exposure and other parameters being constant in the LCD mode, with parameters resetting to standard mode following Step 522 YES condition. For example as to adding steps, an optical code portion acquired in one image may be combined with another optical code portion from another image and thus be assembled into a complete optical code, the process being generally known as stitching. Another additional step may be an optional reset step after Step 522 following the YES condition whereby the control parameters are updated/reset to standard mode. Though a given sequence of steps in method 500 is described, certain of the steps may be undertaken in other/different sequences. For example, the decrementation in Step 524 may be undertaken at any suitable time; in another example, the decode image Step 536 may be undertaken before Step 534.

While certain preferred systems and methods have been shown and described, it will be apparent to one skilled in the art that modifications, alternatives and variations are possible without departing from the inventive concepts set forth herein. Therefore, the invention is intended to embrace all such modifications, alternatives and variations.

The invention claimed is:

1. A method for data reading of an optical code being displayed on an electronic display, comprising the steps of:
   (1) in standard reading mode, illuminating the field of view with one or more pulses of illumination;
   (2) capturing, via a data reader, a first two-dimensional image (or set of images) of the field of view being illuminated by the one or more pulses, in search of an optical code appearing therein;
   (3) processing the first image(s) in an attempt to decode the optical code;
   (4) analyzing the first image(s), that was/were captured while the field of view was being illuminated by the one or more pulses produced by at least one source of illumination, to determine whether an electronic display is in the field of view;
   (5) if it is determined, in step 4, that an electronic display is in the field of view, switching to electronic display reading mode;
   (6) in electronic display reading mode, for up to a given amount of second image capture/read attempts, capturing, via the data reader, a second two-dimensional image (or set of images) of the field of view without illumination from the one or more pulses, in search of an optical code appearing therein;
   (7) illuminating the field of view with one or more pulses of illumination at least one or both of before and after each second image capture/read attempt;
   (8) processing the second image(s) in an attempt to decode the optical code.

2. A method according to claim 1 wherein the given amount of second image capture/read attempts is selected from the group consisting of: (a) a given plurality of second image capture/read attempts, (b) a given number of second image read or capture cycles, (c) a given time for second image capture/read attempts.

3. A method according to claim 1 further comprising
   if it is determined that an electronic display is not in the field of view, remaining in standard reading mode, and performing an exposure analysis of the first image(s) and adjusting exposure time for a subsequent image exposure.

4. A method according to claim 1 further comprising setting an exposure time during the electronic display reading mode at a longer time exposure than that of the standard mode exposure time.

5. A method according to claim 1 wherein the given amount of second image capture/read attempts is a given plurality of second image capture/read attempts, wherein the given plurality of second image capture/read attempts comprises on the order of 20 attempts.

6. A method according to claim 1 wherein the step of analyzing the first image(s) to determine whether an electronic display is in the field of view, comprises
   analyzing a histogram of the first image(s) to determine whether the histogram is bi-modal;
   automatically adjusting operating parameters of the data reader based on whether the histogram is bi-modal;
   capturing, via the data reader, a second image(s) of the item bearing the optical code using the adjusted operating parameters; and
   processing the second set of images to decode the optical code appearing in the second image(s) of the item.

7. A method according to claim 6, wherein analyzing the histogram to determine whether the histogram is bi-modal includes:
   comparing a first number of pixels against a predetermined grayscale low threshold percentage; and
   comparing a second number of pixels against a predetermined grayscale high threshold percentage.

8. A method according to claim 1 further comprising
   determining whether the electronic display is backlit; and
   adjusting operating parameters of an imager of the data reader based on whether the display screen is determined to be backlit.

9. A system for data reading comprising:
   an imager for capturing an image of an item bearing an optical code;
   an illumination source for illuminating the item; and
   a controller for operating the imager and the illumination source, wherein the controller is programmed to,
   operate the imager to capture a first two-dimensional image (or set of first images) of the item being illuminated by the illumination source;
   analyze the first image(s) to determine whether the item is likely to comprise an electronic display screen;
   if determined that the item is likely to comprise an electronic display screen, for up to a given amount of second image capture/read attempts, operate the imager (a) to capture a second two-dimensional image(s) of the item without illumination from the illumination source, and (b) to illuminate the field of view with a pulse of illumination at least one or both of before and after each of the second image capture/read attempts.

10. A system for data reading according to claim 9 wherein the given amount of second image capture/read attempts is selected from the group consisting of: (1) a given plurality of second image capture/read attempts, (2) a given number of second image read or capture cycles, (3) a given time for second image capture/read attempts.

11. A system for data reading according to claim 9 further comprising a timer, wherein the given amount of second image capture/read attempts is a given time for second image capture/read attempts, wherein the timer is operative for measuring or counting down the given time for second image capture/read attempts.

12. A system for data reading according to claim 9 wherein if determined that the item is likely to comprise an electronic display screen, for up to a given amount of image capture/read attempts, the controller is further programmed to (c) operate the imager to capture a second two-dimensional image(s) of the item without illumination from the illumination source and using alternate operating parameters.

13. A system for data reading according to claim 12, wherein the alternate operating parameters in the capture/read attempts of the second image comprises exposure time for image capture.

14. A system for data reading according to claim 12, wherein the controller is further programmed to adjust operating parameters of the imager based on whether the display screen is backlit.

15. A method for data reading comprising:
   with an imager, capturing an image of an item bearing an optical code;
   illuminating the item via at least one illumination source; and
   controlling operation of the imager and the illumination source by
      operating the imager to capture a first two-dimensional image (or set of images) of the item being illuminated by the illumination source,
      analyzing the first image(s) to determine whether the item is likely to comprise an electronic display screen;
      if determined that the item is likely to comprise an electronic display screen, for up to a given amount of image capture/read attempts, (a) operating the imager to capture a second two-dimensional image(s) of the item without illumination from the illumination source, and (b) illuminating the field of view with a pulse of illumination at least one or both of before and after the capture/read attempts.

16. A method for data reading according to claim 15 wherein the given amount of second image capture/read attempts is selected from the group consisting of: (1) a given plurality of second image capture/read attempts, (2) a given number of second image read or capture cycles, (3) a given time for second image capture/read attempts.

17. A method for data reading according to claim 15 further comprising via a timer, measuring or counting down a given time for second image capture/read attempts, wherein the given amount of second image capture/read attempts corresponds to a given time for second image capture/read attempts.

18. A method for data reading according to claim 15 wherein if determined that the item is likely to comprise an electronic display screen, for up to a given amount of image capture/read attempts, (c) operating the imager to capture second two-dimensional image(s) of the item without illumination from the illumination source and using alternate operating parameters.

19. A method for data reading according to claim 18, wherein the alternate operating parameters in the capture/read attempts of the second image comprises exposure time for image capture.

20. A method for data reading according to claim 18, further comprising adjusting operating parameters of the imager based on whether the display screen is backlit.

* * * * *